(12) United States Patent
Lemke et al.

(10) Patent No.: US 11,511,982 B2
(45) Date of Patent: Nov. 29, 2022

(54) BASE FRAME FOR A REACH TRUCK

(71) Applicant: Jungheinrich Aktiengesellschaft, Hamburg (DE)

(72) Inventors: Frank Lemke, Kaltenkirchen (DE); Boyan Belchev, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 943 days.

(21) Appl. No.: 16/251,234

(22) Filed: Jan. 18, 2019

(65) Prior Publication Data
US 2019/0225467 A1 Jul. 25, 2019

(30) Foreign Application Priority Data
Jan. 24, 2018 (DE) ..................... 10 2018 101 539.9

(51) Int. Cl.
| | | |
|---|---|---|
| *B66F 9/075* | (2006.01) | |
| *B66F 9/10* | (2006.01) | |
| *B66F 9/12* | (2006.01) | |
| *B62D 21/18* | (2006.01) | |
| *B66F 17/00* | (2006.01) | |

(52) U.S. Cl.
CPC ........ *B66F 9/07513* (2013.01); *B62D 21/186* (2013.01); *B66F 9/07554* (2013.01); *B66F 9/07559* (2013.01); *B66F 9/10* (2013.01); *B66F 9/12* (2013.01); *B66F 17/003* (2013.01)

(58) Field of Classification Search
CPC .............. B66F 9/07554; B66F 9/07513; B66F 9/07559
See application file for complete search history.

(56) References Cited

U.S. PATENT DOCUMENTS

| | | | | |
|---|---|---|---|---|
| 2,264,512 | A * | 12/1941 | Dunham | B66F 9/07572 |
| | | | | 414/635 |
| 3,029,088 | A * | 4/1962 | Loef | B66F 9/07554 |
| | | | | 280/62 |
| 3,756,350 | A | 9/1973 | Gandolfo et al. | |

(Continued)

FOREIGN PATENT DOCUMENTS

| | | | | |
|---|---|---|---|---|
| DE | 2110761 A1 * | 9/1972 | | B66F 9/07554 |
| DE | 2658696 A1 * | 6/1978 | | B62D 49/00 |
| DE | 2658696 A1 | 6/1978 | | |

(Continued)

OTHER PUBLICATIONS

Machine Translation of DE 2110761.*

(Continued)

*Primary Examiner* — Diem M Tran
(74) *Attorney, Agent, or Firm* — Barclay Damon LLP

(57) ABSTRACT

A base frame for a reach truck comprises a wheel arm subassembly comprising two wheel arms each having a front end and an opposing rear end. A load wheel receiver is positioned on each rear end and a counterweight is positioned at the front end of the wheel arms and coupled to the wheel arm subassembly by a plurality of screw connections. The plurality of screw connections comprise a first portion of screw connections and a second portion of screw connections. The first portion of screw connections each extend in a first direction and the second portion of the screw connections each extend in a second direction which is different from the first direction.

13 Claims, 5 Drawing Sheets

(56) References Cited

U.S. PATENT DOCUMENTS 4,067,415 A * 1/1978 Samide ................ B62D 49/085
187/222

FOREIGN PATENT DOCUMENTS

| DE | 3910882 A1 | 10/1990 |
| DE | 10312432 A1 | 12/2003 |
| DE | 69618699 T3 | 3/2006 |
| DE | 602004006455 T2 | 2/2008 |
| EP | 3053871 A1 | 8/2016 |
| JP | H0986894 A | 3/1997 |
| JP | 2001151487 A | 5/2001 |

OTHER PUBLICATIONS

Machine Translation of DE 2658696.*
DE 102018101539.9 filed Jan, 24, 20018; German Search Report dated Feb. 6, 2019; 8 pages.
EP 19150802.7 filed Jan. 8, 2018; European Search Report dated Jun. 14, 2019; (10 pages).

* cited by examiner

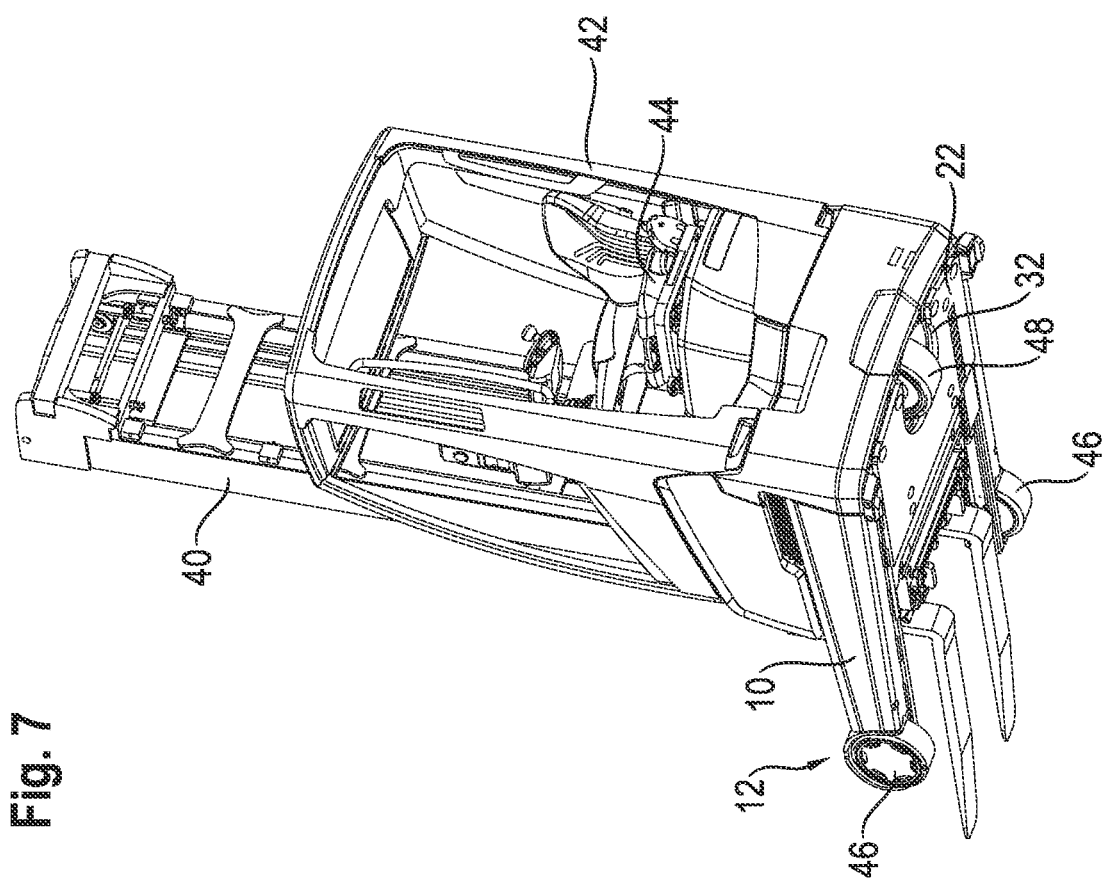
Fig. 7
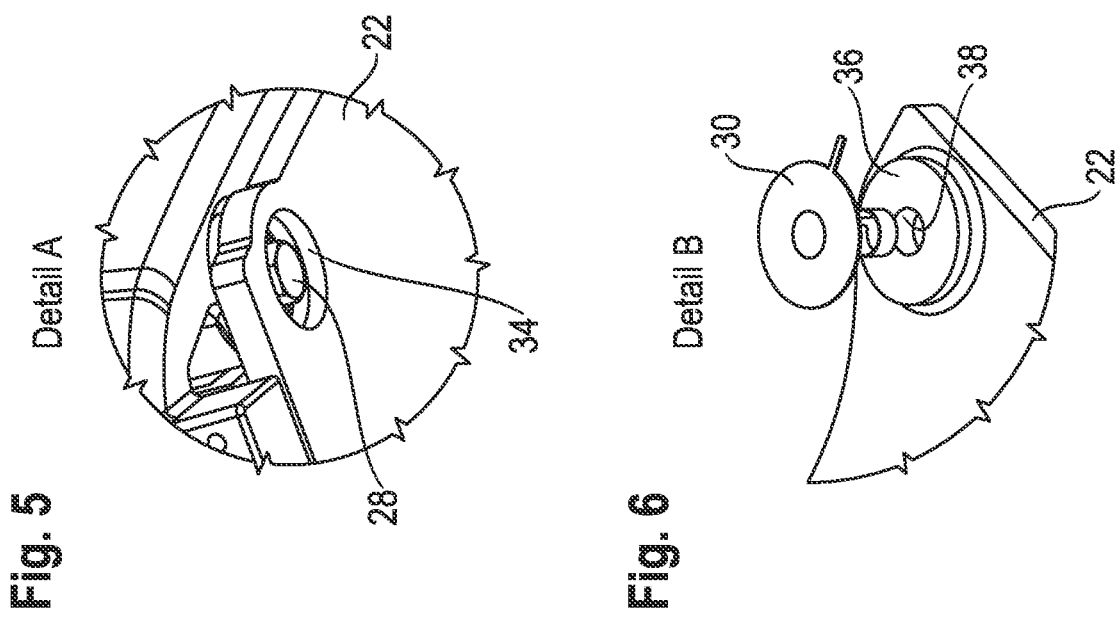
Fig. 5
Fig. 6

BASE FRAME FOR A REACH TRUCK

CROSS REFERENCE TO RELATED INVENTION

This application is based upon and claims priority to, under relevant sections of 35 U.S.C. § 119, German Patent Application No. 10 2018 101 539.9, filed Jan. 24, 2018, the entire contents of which are hereby incorporated by reference.

BACKGROUND

The invention relates to a base frame for a reach truck. The base frame receives all substantial loads acting on the vehicle, in particular the wheels of the vehicle, the lifting frame and a driver's seat and/or a driver's cab being arranged on the base frame. Base frames for reach trucks have two wheel arms, in each case a wheel receiver being arranged on the front ends thereof. The lifting frame is displaceably guided between the two wheel arms.

Known base frames for reach trucks are produced as a welded subassembly and comprise a plurality of transverse members which connect the two wheel arms to a torsionally stiff frame. Other members, for example longitudinal members, may also be used. In addition to torsional stiffness, in the construction of base frames for reach trucks, in particular, dimensions which are as small as possible in the vehicle longitudinal direction play an important role as well as an optimal use of the constructional space.

In forklift trucks which are not configured as reach trucks, the use of counterweights for compensating the tilting moments exerted by a received load are common. Such a forklift truck with a counterweight has been disclosed in the publication DE 696 18 699 T2, in which the counterweight is configured as a cast product and in addition to its function as a counterweight serves at the same time as a carrier for a drive unit and a steering motor.

BRIEF SUMMARY OF THE INVENTION

Proceeding therefrom, it is the object of the invention to provide an improved base frame for a reach truck.

In an embodiment, a base frame for a reach truck comprises a wheel arm subassembly which comprises two wheel arms that each have a load wheel receiver located on their rear ends. A counterweight comprised of cast iron is positioned at a front end of the wheel arms and is connected to the wheel arm subassembly by a number of screw connections. A first portion of the screw connections in each case has a longitudinal direction which is oriented in a first direction and a second portion of the screw connections in each case has a longitudinal direction which is oriented in a second direction such that the first direction is different from the second direction.

The two wheel arms are preferably produced from steel. In each case a guide rail for a lifting mast may be arranged on the wheel arms. As a further component, the base frame comprises a counterweight made of cast iron which is connected to the wheel arm subassembly by a number of screw connections. Each screw connection has a longitudinal direction. This corresponds to the direction in which the two components are braced relative to one another by the screw connection, i.e. in particular the longitudinal direction of a screw used for the screw connection or a threaded bolt used for the screw connection. In the invention, the threaded joint between the counterweight and the wheel arm subassembly comprises screw connections in at least two different directions. As a result, the counterweight integrated in the base frame may provide a substantial contribution to the stability of the base frame and, in particular, increase the torsional stiffness thereof.

The counterweight consists of cast iron, in particular a cast iron denoted as nodular graphite iron which contains spheroidal graphite. In principle, cast iron is characterised by its freely selectable shaping which promotes optimal usability of the constructional space within the base frame. Nodular graphite iron can also be worked particularly easily. At least one of the screw connections or all of the screw connections may comprise a threaded bore in the counterweight. In particular, in combination with nodular graphite iron a stable threaded joint which is easy to assemble is thus possible.

As distinguished from forklift trucks, reach trucks of conventional design require no counterweight. An advantageous weight distribution in electrically driven vehicles may be already achieved by a suitable arrangement, in particular, of the vehicle battery. This applies, in particular, when using conventional heavy lead-acid batteries. When using new battery technologies, in particular comprising lithium-ion batteries, however, according to the invention the counterweight made of cast iron which is integrated in the base frame may provide a significant contribution to optimal weight distribution.

In one embodiment, the wheel arm subassembly is a welded subassembly which has a transverse connection welded to the two wheel arms. In this case, the wheel arm subassembly forms a prefabricated unit which may be produced in the conventional manner. In principle, however, it is also possible to connect together the two wheel arms in a different manner or to use a multipart wheel arm subassembly.

In one embodiment, the first direction and the second direction are oriented at right angles to one another. In particular, one of the two directions may be oriented horizontally and the other of the two directions may be oriented vertically. By such an orientation an optimal bracing effect of the base frame may be achieved by the threaded joint with the counterweight.

In one embodiment, the first portion and/or the second portion of the screw connections are configured for transmitting forces transversely to their respective longitudinal direction. To this end, different measures which improve the ability to transmit transverse forces may be implemented. This contributes to a high degree of torsional stiffness of the base frame.

In one embodiment, the first portion and/or the second portion of the screw connections are configured for permitting tolerance compensation transversely to the respective longitudinal direction thereof. This may be achieved, for example, by an elongated hole or by a bore, the diameter thereof being selected to be larger, at least by the tolerance to be compensated, than the diameter of a screw or a bolt. Such a tolerance compensation may, in particular, be provided exclusively for one of the two portions of the screw connections, whilst the other portion has a more accurate fit for the purpose of optimal stability.

In one embodiment, at least one of the screw connections has a dowel pin arranged in a through-bore of the wheel arm subassembly and a screw inserted into the dowel pin. The dowel pin serves for a positive anchoring of the screw in the through-bore and is particularly suitable for transmitting transverse forces.

In one embodiment, at least one of the screw connections has a disc increasing the coefficient of friction arranged between the wheel arm subassembly and the counterweight. By this measure, a particularly good transmission of transverse forces is also ensured. The disc increasing the coefficient of friction may, in particular, be a diamond disc, for example a disc coated with diamond dust.

The aforementioned embodiments comprising a dowel pin or a disc increasing the coefficient of friction may, in particular, be used in each case for all of the screw connections of one of the two portions. For example all of the screw connections of the first portion may have a dowel pin for optimal transmission of transverse forces, whilst all of the screw connections of the other portion may be provided with the possibility of tolerance compensation and a disc increasing the coefficient of friction in order to permit simultaneously tolerance compensation and optimal transmission of transverse forces.

In one embodiment, the transverse connection has a horizontally arranged base plate and/or a vertically arranged transverse member. The base plate and/or transverse member may be produced in a plate-shaped manner and/or from steel. The transverse member may be arranged in a central portion of the wheel arms. The base plate may extend from the transverse member to the front, i.e. away from the rear ends of the wheel arms with the load wheel receivers. The transverse member may be arranged at a vertical spacing from the base plate. The transverse member may protrude over an upper edge of the wheel arms. The illustrated arrangement of the base plate and/or transverse member is advantageous for the arrangement and fastening of further vehicle components to the base frame.

In one embodiment, the first portion of the screw connections is present between the counterweight and the transverse member and/or the second portion of the screw connections is present between the counterweight and the base plate. In principle, the screw connections may be arranged between the counterweight and the wheel arm subassembly on different elements of the wheel arm subassembly, for example between the counterweight and a wheel arm. A threaded joint with the base plate and/or with the transverse member is suitable for the desired bracing effect and may be additionally assembled in a particularly simple manner.

In one embodiment, at least one of the screw connections has a screw head which is arranged so as to be countersunk, wherein to this end the material of the welded subassembly is provided with a through-bore with a diameter which is larger than the screw head and with a welded-on disc which has a smaller through-bore. The disc may, in particular, be circular. The smaller through-bore is, in particular, arranged concentrically to the larger through-bore. Together the two through-bores form a step and the larger through-bore may entirely receive the screw head. A countersunk arrangement of the screw heads may, in particular, ensure the required protection on the vehicle underside. The construction comprising the welded-on disc permits a connection which is cost-effective and material-saving and which has a high load-bearing capacity.

In one embodiment, an upper face of the welded-on disc forms a contact surface for a disc increasing the coefficient of friction arranged between the wheel arm subassembly and the counterweight. This solution is advantageous for the transmission of transverse forces and is structurally simple.

In one embodiment, the counterweight has a recess which receives the welded-on disc. In this construction, the freedom in the shaping of the cast counterweight is utilised in order to fasten the counterweight and the wheel arm subassembly at a particularly small spacing from one another. The material strength of the wheel arm subassembly increased by the disc is compensated by the recess.

In one embodiment, a base of the recess forms a contact surface for a disc increasing the coefficient of friction arranged between the wheel arm subassembly and the counterweight. In particular, the disc increasing the coefficient of friction may bear with one side directly against the base of the recess and with the other side directly against the welded-on disc.

In one embodiment, the counterweight extends over the entire width of the base frame and/or the centre of gravity of the counterweight is arranged below the centre of gravity of the wheel arm subassembly and/or below an upper edge of the wheel arms. As a result, the counterweight may make a significant contribution to the function of the base frame and to a low centre of gravity of the reach truck.

In one embodiment, the counterweight has fastening means for fastening a driver's cab and/or a drive wheel carrier to the counterweight. Accordingly, the counterweight not only contributes to the bracing of the base frame and to optimal weight distribution but at the same time fulfils an additional function as a carrier of the aforementioned components of the reach truck.

In one embodiment, the reach truck may, in particular, have a lifting mast and an electrical drive system with a drive battery. In particular, the reach truck may have a driver's cab and/or a drive wheel carrier fastened to the counterweight.

BRIEF DESCRIPTION OF THE DRAWINGS

Hereinafter, the invention is described in more detail with reference to an exemplary embodiment shown in the figures, in which:

FIG. 5 illustrates an enlarged view of the area A of FIG. 3;

FIG. 6 illustrates an enlarged view of the area B of FIG. 2; and

FIG. 7 illustrates a bottom perspective view of an embodiment of a reach truck with the base frame of FIG. 1.

DETAILED DESCRIPTION OF THE INVENTION

Figure 1:
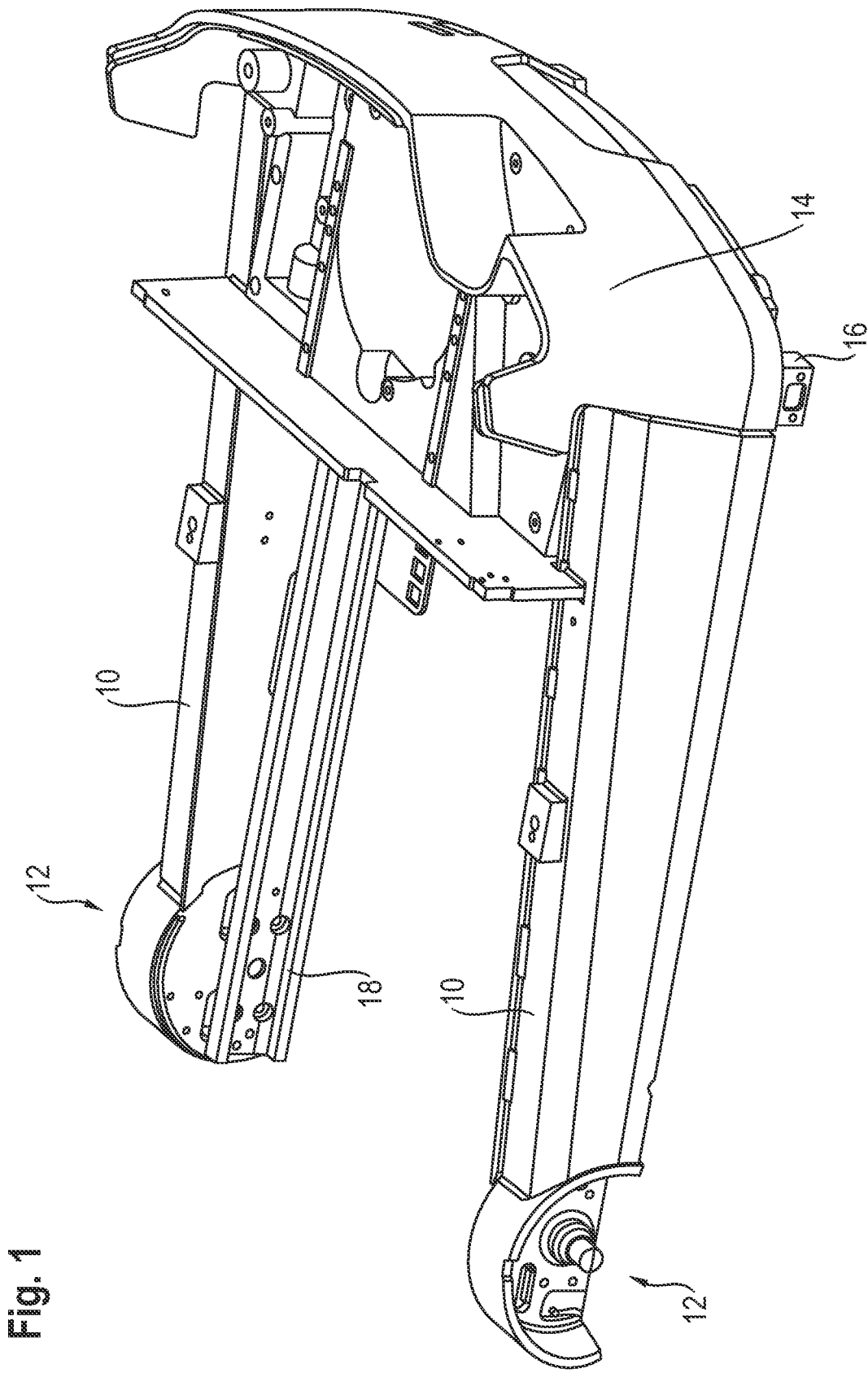
FIG. 1 illustrates top perspective view of an embodiment of a base frame for a reach truck.

The base frame of FIG. 1 has two wheel arms 10, in each case a load wheel receiver 12 being able to be identified on the rear ends thereof. Each of the wheel arms 10 has on its inner face a guide rail 18 for the lifting mast. In the language used in this application, the end of the base frame or, respectively, of the reach truck remote from the load wheel receivers 12 is denoted as the front end.

At the front end of the wheel arms 10 is located a counterweight 14 which is made of cast iron and which extends substantially over the entire width of the base frame. The front end of the counterweight 14 forms at the same time the front end of the vehicle and has a slightly rounded shape. A fastening base 16 is arranged in each case at the lower end of the counterweight 14 on both sides for a supporting element which is also denoted as a supporting cone.

Figure 2:
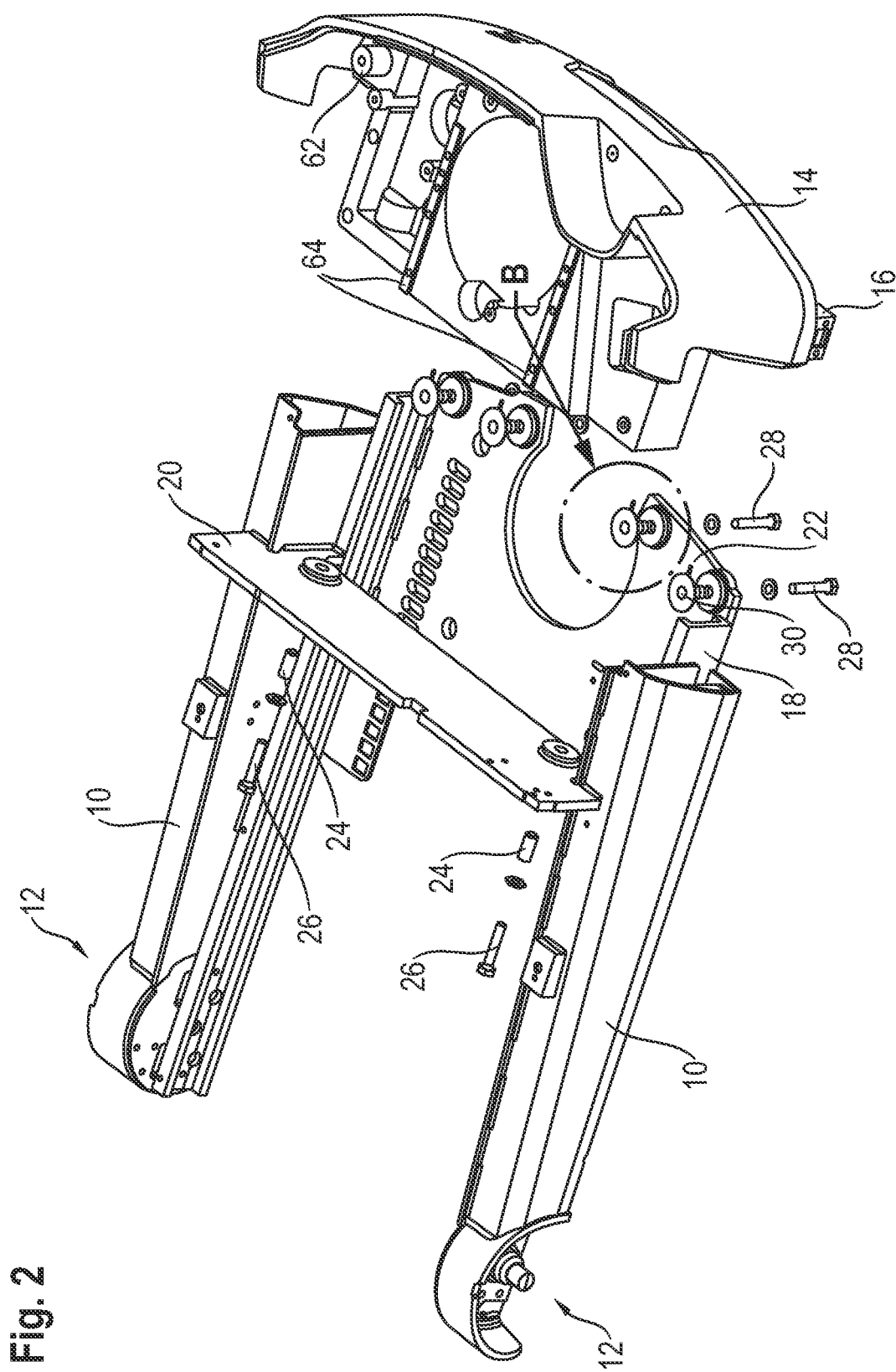
FIG. 2 illustrates an exploded view of the base frame of FIG. 1.

Further details are able to be identified more clearly in FIG. 2. It is identified here that a transverse connection between the two wheel arms 10 is formed by a transverse member 20 and by a base plate 22. The transverse member 20 is a vertically arranged steel plate. The transverse member is welded to the wheel arms 10 at a central position of the wheel arms 10, upstream of a space intended for the lifting mast. In the exemplary embodiment shown, the wheel arm subassembly is thus a welded subassembly with a transverse connection.

The base plate 22 is a horizontally arranged steel plate. The base plate 22 extends in the vehicle longitudinal direction approximately from the position of the transverse member 20 to the front, substantially as far as the front end of the counterweight 14 or, respectively, of the vehicle. The transverse member 20 has a vertical spacing from the base plate 22.

The counterweight 14 consists of nodular graphite iron. The counterweight 14 has a rear portion which is arranged between the front ends of the wheel arms 10 and a wider portion adjacent thereto at the front, which extends over the entire width of the base frame and which forms a front end of the base frame.

FIG. 2 also illustrates the arrangement of six screw connections between the welded subassembly and the counterweight 14. A first portion of these screw connections, namely the two screw connections between the transverse member 20 and the counterweight 14, has in each case a through-bore in the transverse member 20, a dowel pin 24 inserted into this through-bore and a screw 26 inserted into the dowel pin 24. The threaded portions of the screws 26, not shown in detail, are screwed into threaded bores in the counterweight 14 which are concealed in FIG. 2.

A second portion of the screw connections, namely the four screw connections configured between the base plate 22 and the counterweight 14, in each case has a through-bore in the base plate 22, a screw 28 inserted into the through-bore and a diamond disc 30. These screws 28 are also screwed with threaded portions, not shown in detail, into threaded bores in the counterweight 14. These threaded bores in the counterweight 14 are also not visible in FIG. 2.

In the exploded view of FIG. 2, the screws 26, 28 in each case are illustrated in the longitudinal direction of the screw connections. It may be identified that the screw connections with the screws 26, i.e. the first portion of the screw connections, are oriented horizontally whilst the screw connections with the screws 28, as the second portion of the screw connections, are oriented vertically.

Moreover, FIG. 2 shows fastening means for a driver's cab in the form of two threaded domes 62 which are configured in the vicinity of the front corners of the counterweight 14 and which have a defined bearing surface for a driver's cab support structure and a threaded bore. For fastening a drive wheel carrier/a drive system, the counterweight 14 additionally has further fastening bores arranged in two rows 64.

Figure 3:
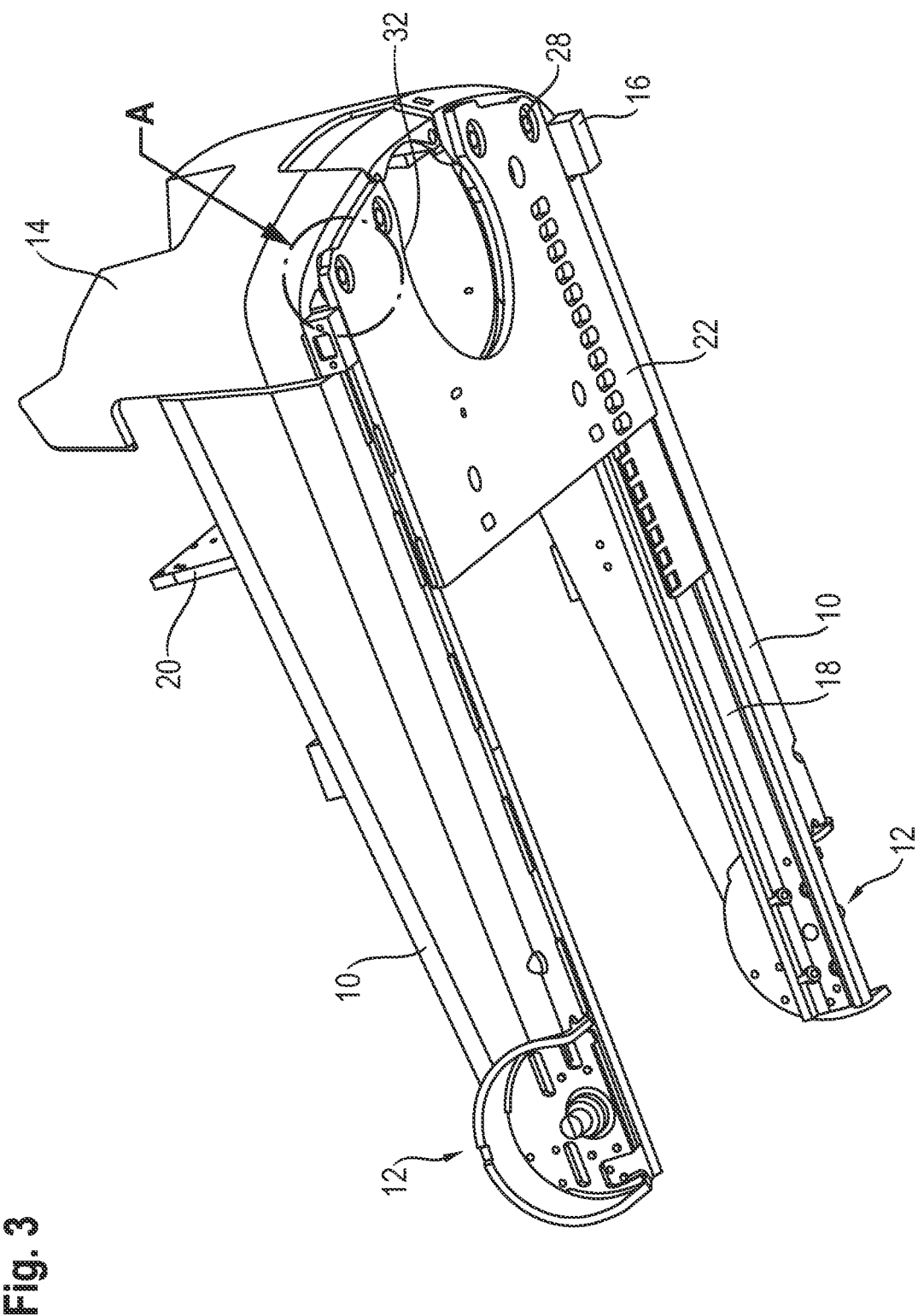
FIG. 3 illustrates a bottom perspective view of the embodiment of the base frame of FIG. 1.

In the view of FIG. 3 of the base frame obliquely from below is identified particularly clearly a recess 32 for a drive wheel which is open to the front edge of the base plate 22, the drive wheel carrier thereof being mounted on the counterweight 14. It is also able to be identified that the heads of the screws 28 are arranged so as to be countersunk in the base plate 22.

Figure 4:
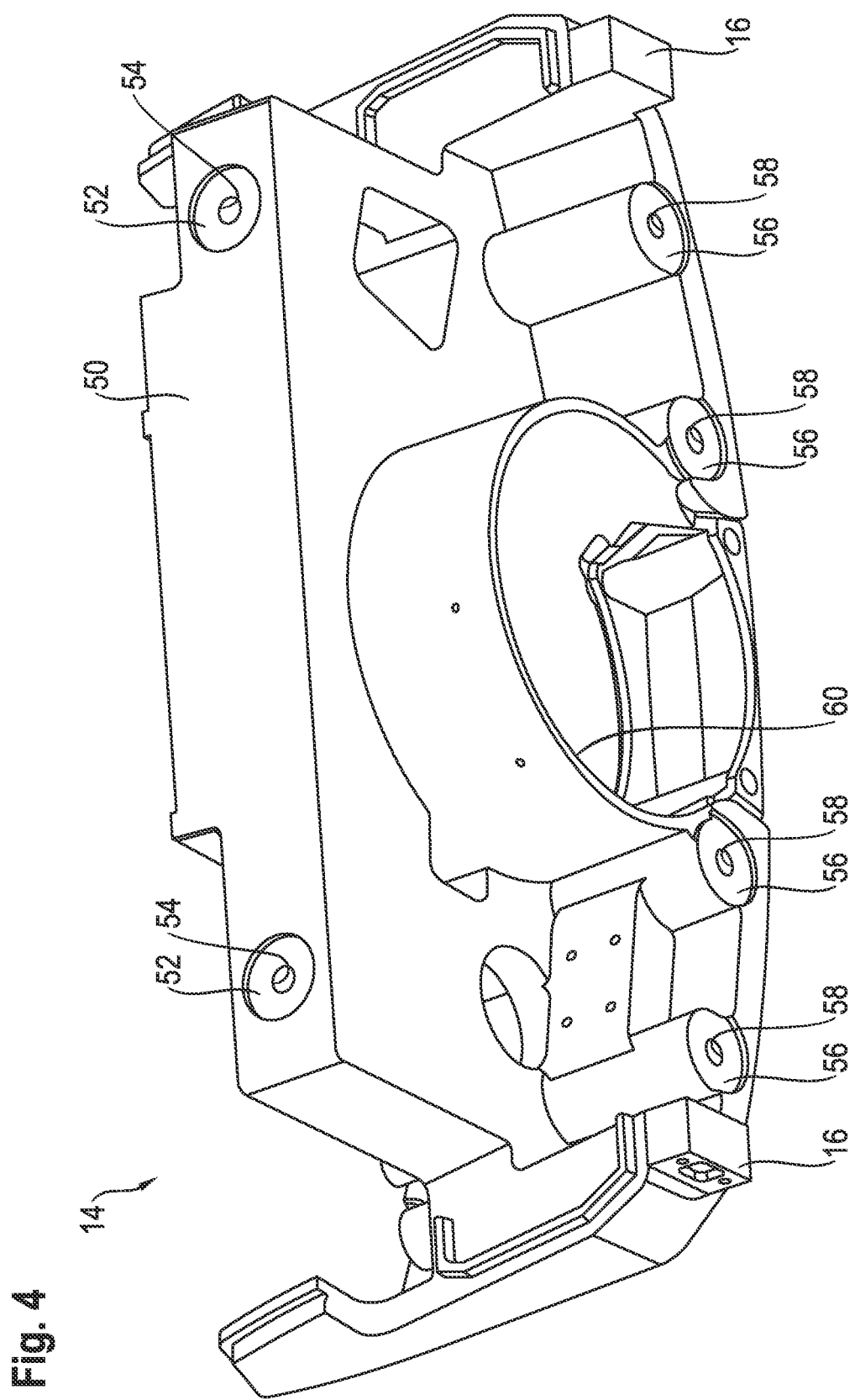
FIG. 4 illustrates a bottom perspective view of an embodiment of the counterweight of the base frame of FIG. 1.

In FIG. 4 the counterweight 14 is shown alone. A rear surface 50 which is assigned to the transverse member 20 may be identified on the aforementioned rear portion of the counterweight 14 arranged between the wheel arms 10. Two circular recesses 52 with central threaded bores 54 are shown in the rear surface 50 for receiving the screws 26 (FIG. 3). These threaded bores 54 are designed as stepped bores. In a rear longitudinal portion these threaded bores have an enlarged diameter which receives a portion of one of the dowel pins 24. A front longitudinal portion with a smaller diameter adjoins one step, said front longitudinal portion having an inner thread for screwing in the screw 26 (FIG. 3). Further recesses 56 with central threaded bores 58 for receiving the screws 28 (FIG. 3) may be identified on the lower front edge of the counterweight 14. The counterweight 14 has an opening 60 for receiving a drive wheel and a drive wheel carrier. This opening 60 is dimensioned and arranged so as to correspond to the recess 32 in the base plate 22 (FIGS. 2-3).

The enlargement shown in FIG. 5 of the area A of FIG. 3 shows more clearly that the base plate 22 has a through-bore 34 with a diameter which is markedly larger than the diameter of the head of the screw 28. The head of the screw 28 is entirely arranged inside this through-bore 34 and does not protrude downwardly over the base plate 22.

The area B of FIG. 2 shown enlarged in FIG. 6 shows the other side of this screw connection, i.e. obliquely from above in the viewing direction. It may be identified here that above the through-bore 34 of the base plate 22 a circular disc 36 is welded onto the base plate 22, wherein the welded-on circular disc 36 in turn has a smaller through-bore 38. This through-bore 38 receives a shank portion of the screw 28. The upper face of the welded-on circular disc 36 which faces the observer in FIG. 5 forms a contact surface for the diamond disc 30. The upper face of the diamond disc 30 bears against the base of a recess 56 in the counterweight 14, shown in FIG. 4, which receives the welded-on circular disc 36.

FIG. 7 shows a reach truck with the base frame of FIG. 1 in a perspective view obliquely from the front/below. The reach truck is electrically driven and has a displaceably arranged lifting frame 40, a driver's cab 42 and a driver's seat 44. It may be identified that the load wheel receivers 12 of the two wheel arms 10 in each case have received a load wheel 46 and that a steerable drive wheel 48 is arranged in the recess 32 of the base plate 22.

LIST OF REFERENCE NUMERALS USED

10 Wheel arm
12 Load wheel receiver
14 Counterweight
16 Fastening base for support element
18 Guide rail
20 Transverse member
22 Base plate
24 Dowel pin
26 Screw
28 Screw
30 Diamond disc
32 Recess
34 Through-bore
36 Welded-on disc
38 Through-bore
40 Lifting frame
42 Driver's cab
44 Driver's seat 46 Load wheel
48 Drive wheel
50 Rear surface
52 Recess
54 Threaded bore
56 Recess
58 Threaded bore
60 Opening
62 Threaded dome
64 Row of fastening bores

The invention claimed is:

1. A base frame for a reach truck, comprising:
a wheel arm subassembly comprising two wheel arms each having a front end and an opposing rear end, wherein a load wheel receiver is positioned on each rear end; and
a counterweight positioned at the front end of the two wheel arms and coupled to the wheel arm subassembly by a plurality of screw connections, wherein the plurality of screw connections comprise a first portion of screw connections and a second portion of screw connections,
wherein the first portion of screw connections each extend in a first direction and the second portion of the screw connections each extend in a second direction which is different from the first direction,
wherein at least one of the plurality of screw connections comprises a screw head configured to be countersunk, and wherein the wheel arm subassembly defines a through-bore with a diameter which is larger than the screw head and a welded-on disc defining a through-bore that is smaller than the screw head.

2. The base frame according to claim 1, wherein an upper face of the welded-on disc forms a contact surface for a disc positioned between the wheel arm subassembly and the counterweight, and wherein the disc is configured to increase a coefficient of friction between the wheel arm subassembly and the counterweight.

3. The base frame according to claim 2, wherein the counterweight defines a recess configured to receive the welded-on disc.

4. The base frame according to claim 3, wherein a base of the recess forms a contact surface for a disc positioned between the wheel arm subassembly and the counterweight, and wherein the disc is configured to increasing the coefficient of friction between the wheel arm subassembly and the counterweight.

5. The base frame according to claim 1, wherein the counterweight extends a width of the base frame.

6. The base frame according to claim 1, wherein at least one of a driver's cab and a drive wheel carrier are configured to fasten to the counterweight.

7. The base frame according to claim 1, wherein the counterweight is comprised of cast iron and configured to provide torsional stability for the reach truck.

8. A base frame for a reach truck, comprising:
a wheel arm subassembly comprising two wheel arms each having a front end and an opposing rear end, wherein a load wheel receiver is positioned on each rear end; and
a counterweight positioned at the front end of the two wheel arms and coupled to the wheel arm subassembly by a plurality of screw connections, wherein the plurality of screw connections comprise a first portion of screw connections and a second portion of screw connections,
wherein the first portion of screw connections each extend in a first direction and the second portion of the screw connections each extend in a second direction which is different from the first direction,
wherein a center of gravity of the counterweight is below a center of gravity of the wheel arm subassembly.

9. The base frame according to claim 8, wherein the center of gravity of the counterweight is below an upper edge of each wheel arm.

10. The base frame according to claim 8, wherein the wheel arm subassembly defines at least one through-bore configured to accept a dowel pin, and wherein the dowel pin is configured to accept a screw.

11. The base frame according to claim 8, wherein the wheel arm subassembly comprises a transverse connection welded to the two wheel arms.

12. The base frame according to claim 11, wherein the transverse connection comprises at least one of a horizontally arranged base plate and a vertically arranged transverse member.

13. The base frame according to claim 8, wherein the counterweight is comprised of cast iron and configured to provide torsional stability for the reach truck.

* * * * *